(12) United States Patent
Tanaka et al.

(10) Patent No.: US 8,406,615 B2
(45) Date of Patent: Mar. 26, 2013

(54) CONTENT REPRODUCTION DEVICE

(75) Inventors: Akihiro Tanaka, Osaka (JP); Hideki Kagemoto, Nara (JP); Koichiro Yamaguchi, Takatsuki (JP); Yoshihisa Terada, Kamagaya (JP)

(73) Assignee: Panasonic Corporation, Osaka (JP)

( * ) Notice: Subject to any disclaimer, the term of this patent is extended or adjusted under 35 U.S.C. 154(b) by 1441 days.

(21) Appl. No.: 10/578,913

(22) PCT Filed: Dec. 17, 2004

(86) PCT No.: PCT/JP2004/018925
§ 371 (c)(1),
(2), (4) Date: May 9, 2006

(87) PCT Pub. No.: WO2005/062619
PCT Pub. Date: Jul. 7, 2005

(65) Prior Publication Data
US 2007/0071396 A1 Mar. 29, 2007

(30) Foreign Application Priority Data
Dec. 18, 2003 (JP) .................................. 2003-420667

(51) Int. Cl.
H04N 5/783 (2006.01)
(52) U.S. Cl. ........................................ 386/343; 386/350
(58) Field of Classification Search .................... 386/46; 709/219
See application file for complete search history.

(56) References Cited

U.S. PATENT DOCUMENTS 5,956,037 A * 9/1999 Osawa et al. ................. 345/418
7,113,983 B1 * 9/2006 Terada et al. ................. 709/219

FOREIGN PATENT DOCUMENTS

| EP | 1 047 269 | 10/2000 |
|---|---|---|
| GB | 2 362 486 | 11/2001 |
| JP | 10-333956 | 12/1998 |
| JP | 2000-076266 | 3/2000 |
| JP | 2000-148858 | 5/2000 |
| JP | 2000-308038 | 11/2000 |
| JP | 2001-014838 | 1/2001 |
| JP | 2001-224005 | 8/2001 |
| JP | 2002-158989 | 5/2002 |
| JP | 2002-215924 | 8/2002 |
| JP | 2002-366418 | 12/2002 |

(Continued)

OTHER PUBLICATIONS

Partial English translation of JP 2001-014838, Jan. 2001 (translation of paragraphs [0011]-[0051]).

*Primary Examiner* — William C Vaughn, Jr.
*Assistant Examiner* — Asher Khan
(74) *Attorney, Agent, or Firm* — Wenderoth, Lind & Ponack, L.L.P.

(57) ABSTRACT

A content reproduction device changing, according to a reproduction state of a stream media content, multimedia content to be presented after the reproduction of the stream media content has ended. The content reproduction device (100) including: a multimedia browser (102) displaying the multimedia content; a stream media reproducing unit (103) reproducing the stream media content; a reproduction state change instructing unit (104) receiving a user's instruction such as "fast-forward" during the reproduction of the stream media content, and notifying the stream media reproducing unit (103) of the instruction; a reproduction history storing unit (105) storing a reproduction history such as "fast-forward" carried out by the stream media reproducing unit (103); and a return position determining unit (106) determining a URL of a return position based on the reproduction history information stored in the reproduction history storing unit (105) and transition condition information.

24 Claims, 12 Drawing Sheets

FOREIGN PATENT DOCUMENTS

| | | |
|---|---|---|
| JP | 2002-366779 | 12/2002 |
| JP | 2002-366835 | 12/2002 |
| JP | 2003-015990 | 1/2003 |
| JP | 2005-159882 | 6/2005 |

* cited by examiner

FIG. 2A

```
<html>
 <head>
  . . .
 </head>
 <body>
  . . .
  <a href="URL of stream media content#return URL1#return URL2">stream media content</a>
  . . .
 <body>
</html>
```

Link specification 201

| Return URL |
|---|
| URL1 |
| URL2 |

FIG. 2C launchDocument (URL of stream media content, return URL1, return URL2)

- next content
  URL
- bonus content
  URL
- Director's cut version
  URL

- original content
  URL

<Charging screen>
You get 50% off the charges because you viewed the CM.
charging URL <Charging screen>
No reduction available because you did not reproduce the CM.
charging URL

FIG. 7A

```
<html>
<head>
.....
</head>
<body>
.....
<a href="URL of stream media content#return URL1$STOP#return URL2$!FF00:05:00-00:10:00#return URL3$FF30-#·····">stream media content</a>
.....
</body>
</html>
```

Link specification 701

| Return URL | Reproduction state |
|---|---|
| URL1 | STOP |
| URL2 | FF00:05:00 –00:10:00 |
| URL3 | FF00:30– |
| ... | ... |

FIG. 8

```
Return condition =[¥!]?COMMAND TERM? DURATION?
COMMAND =STOP  | FF | REW | PAUSE ···
TERM =TIME-TIME  | TIME-  | -TIME
TIME =[0-9][0-9]:[0-5][0-9]:[0-5][0-9]
DURATION =-[0-9]+  | [0-9]+-
```

| Command | Operational timing |
|---------|--------------------|
| START | — |
| FF | 00:05:00-00:07:00 |
| FF | 00:35:00-00:40:30 |
| REW | 00:40:30-00:40:00 |
| PAUSE | 00:45:00 |

901
902
903
904
905

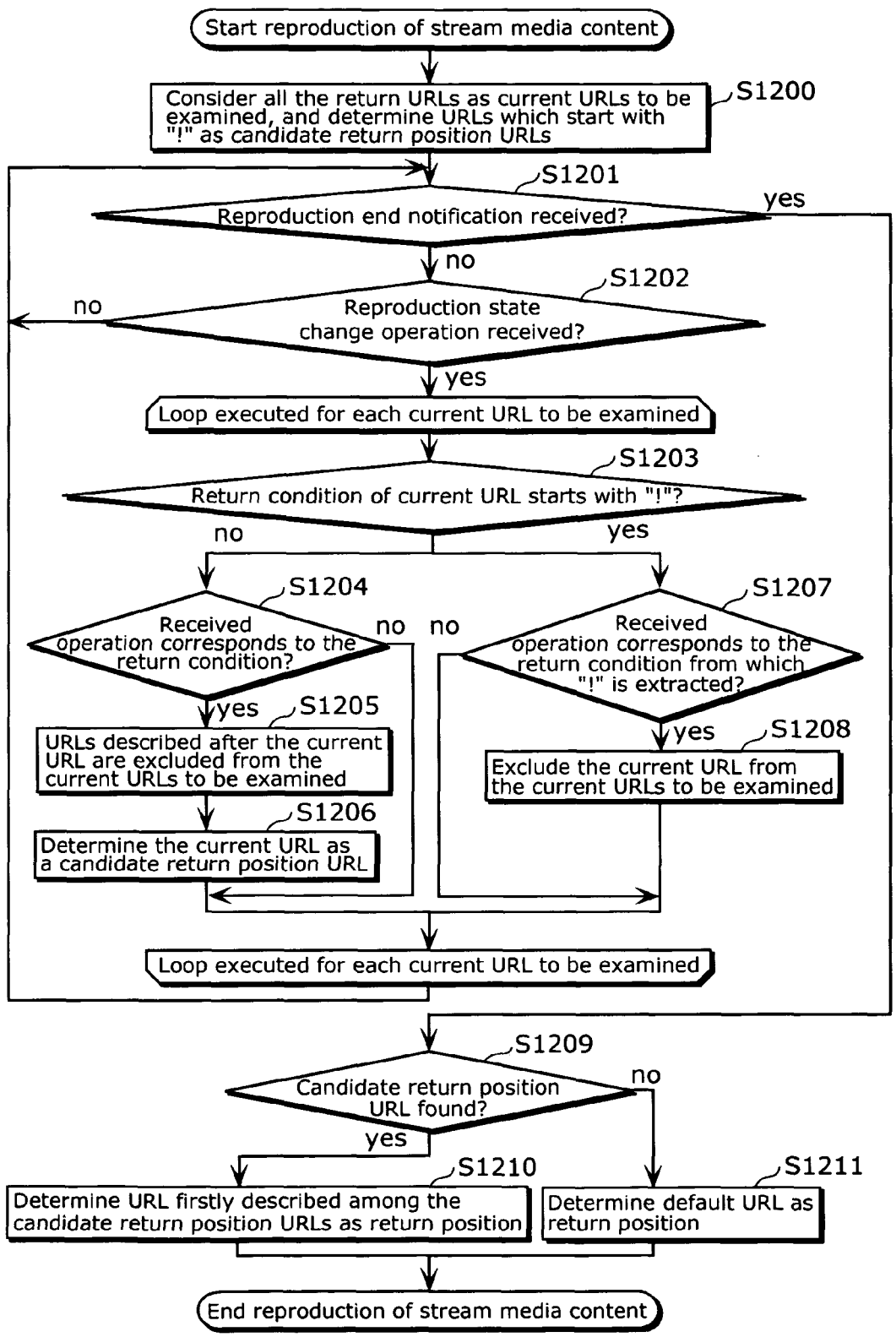

Video stream

CONTENT REPRODUCTION DEVICE

BACKGROUND OF THE INVENTION

1. Field of Invention

The present invention relates to a content reproduction device that downloads a stream media content such as a moving picture, which is a link destination selected from a multimedia content such as a webpage on the Web, and that reproduces the stream media content.

2. Description of the Related Art

In applying the technique of video CD Internet, a conventionally known content reproduction device downloads, via a network, video data within a CD, that is, data specified by a URL through HTTP on the Internet browser screen, by specifying the video data as a link destination.

For example, there is disclosed a reproduction device, which is embodied by equipping, with a proxy, an apparatus having an Internet browser, enables specification of an order of reproducing video data within a CD (see reference to Patent Reference 1).

Patent Reference 1: Japanese Laid-Open Application No. 10-333956

BRIEF SUMMARY OF THE INVENTION

With the conventional art as described above, providing general services, e.g., services for differentiating the next content to be provided according to a state in which the user reproduces a stream media content, still remains to be realized. This is due to the various states of reproducing a content on the side of the user who receives a distribution of contents. Such states include a state in which an advertisement portion such as a distributed commercial message (CM) is fast-forwarded during the reproduction of the content.

On the side of the content provider, a content distribution which reflects the content provider's intentions such as an intention to cause the user to view a CM, or the like, is yet to be realized.

In view of the above problems, an object of the present invention is to provide a content reproduction device which can change a content located in a return position, in accordance with the state of the stream media content being reproduced by the user, in the case of specifying a stream media content such as a moving picture on a multimedia browser screen and reproducing the stream media content.

In order to solve the above problems, the content reproduction device of the present invention is a content reproduction device which reproduces a stream media content linked from a multimedia content, including: a display unit which displays the multimedia content; a reproducing unit which reproduces the stream media content; a reproduction state change accepting unit which accepts, from a user, reproduction state change information indicating a change in a reproduction state of the stream media content; and a return position determining unit which determines, according to the reproduction state change information accepted by the reproduction state change accepting unit, a return position in the multimedia content for a transition after the reproduction of the stream media content is ended, wherein the display unit displays the multimedia content located in the determined return position. In addition, for example, in conjunction with the reproduction state change information, the return position can be determined based on whether (i) all of the stream media content has been reproduced by the reproducing unit or (ii) only a portion of the stream media content has been reproduced by the reproducing unit. Furthermore, for example, the return position can indicate a portion of the multimedia content to be displayed when transitioning from reproducing the stream media content back to displaying the multimedia content when the reproduction of the stream media content has ended.

The return position determination unit of the content reproduction device according to the present invention obtains a transition condition table describing a relationship between the reproduction state and the return position, and determines the return position based on the transition condition table and the reproduction state change information.

According to the structure as described above, in the case of specifying a stream media content such as a moving picture on a multimedia browser screen and reproducing the stream media content, it is possible for the return position determining unit to determine, with reference to the reproduction state change information and the transition condition table, a return position to be back after the reproduction of the stream media content is completed, according to the change in reproduction state accepted by the reproduction state change accepting unit. This enables the content located in the return position to be changed according to the state of the stream media content being reproduced by the user.

In the content reproduction device according to the present invention, at least a first content and a second content are included in the multimedia content to be displayed after the reproduction of the stream media content is ended, and the display unit (a) displays the first content in the case where the reproduction information change information is accepted until the reproduction of the stream media content is ended, and (b) displays the second content in the case where the reproduction information change information is not accepted until the reproduction of the stream media content is ended.

According to the structure as described above, it is possible for the display unit to display the content located in the return position, as a first content or a second content, after the reproduction of the stream media content is ended in accordance with the state of the content being reproduced by the user.

The content reproduction device according to the present invention further includes a reproduction history storing unit which holds a history of the reproduction state change information, wherein upon receiving the reproduction state change information from the reproduction state change accepting unit and changing the reproduction state, the reproducing unit notifies the reproduction history storing unit of the reproduction state change information, and after the reproduction of the stream media content is ended, the return position determining unit reads the history of the reproduction state change information held in the reproduction history storing unit, and determines the return position.

According to the structure as described above, it is further possible for the reproduction history storing unit to store the information about the change in the state of the stream media content being reproduced by the user. The structure also allows the return position determining unit to determine a return position based on the reproduction state change information stored in the reproduction history storing unit.

Note that the present invention can be realized not only as the content reproduction device, but also as a content reproduction method that includes, as steps, the units included in the content reproduction device, or as a program which causes a computer to realize such content reproduction method. The program can be surely distributed via a storage medium such as a DVD, a CD-ROM and the like, or a transmission medium such as a communication network.

The content reproduction device according to the present invention realizes content distribution services such that can change, according to the state of the stream media content being reproduced by the user, a multimedia content to which a stream media content is linked after the reproduction of the stream media content is completed, and such that reflects the content provider's intentions.

BRIEF DESCRIPTION OF DRAWINGS

FIG. 2 shows an example of data description of transition condition information for determining a return position in the content reproduction device according to the first embodiment.

FIG. 7 shows an example of a description of the transition condition information in the case of reproducing a stream media content linked from a multimedia content in a content reproduction device according to a second embodiment.

FIG. 8 is a reference diagram showing an example of a description of a return condition for determining a return position by a return position determining unit.

FIG. 9 is a reference diagram showing an example of reproduction history data to be stored in a reproduction history storing unit.

FIG. 12 is a flowchart showing a processing procedure used by a return position determining unit from when the content reproduction device starts reproducing a stream media content until when the device ends the reproduction.

DETAILED DESCRIPTION OF THE INVENTION

The following describes the content reproduction device according to the present invention, with reference to the diagrams.

First Embodiment

The content reproduction device according to the first embodiment is characteristic in that the device differentiates types of screen to return to, according to the state of reproducing a stream media content, e.g., a moving picture, to be distributed through the selection, on the multimedia browser screen on the Web, of an address linked from the stream media content, after terminating the reproduction.

In the first embodiment, the description is provided assuming that a multimedia content represents a home page written in HTML or the like, a data broadcast content written in Broadcast Markup Language (BML), or the like, whereas a stream media content represents a content such that is viewed by reproducing the content for a predetermined period of time during which video and audio are consecutively reproduced.

The stream media content or the multimedia content to be reproduced by the content reproduction device according to the present invention is not limited to a content distributed from a server apparatus via a network. The stream media content obtained from a hard disk equipped in the content reproduction device or from a storage medium such as a readable DVD and the like may be reproduced by the content reproduction device.

Figure 1:
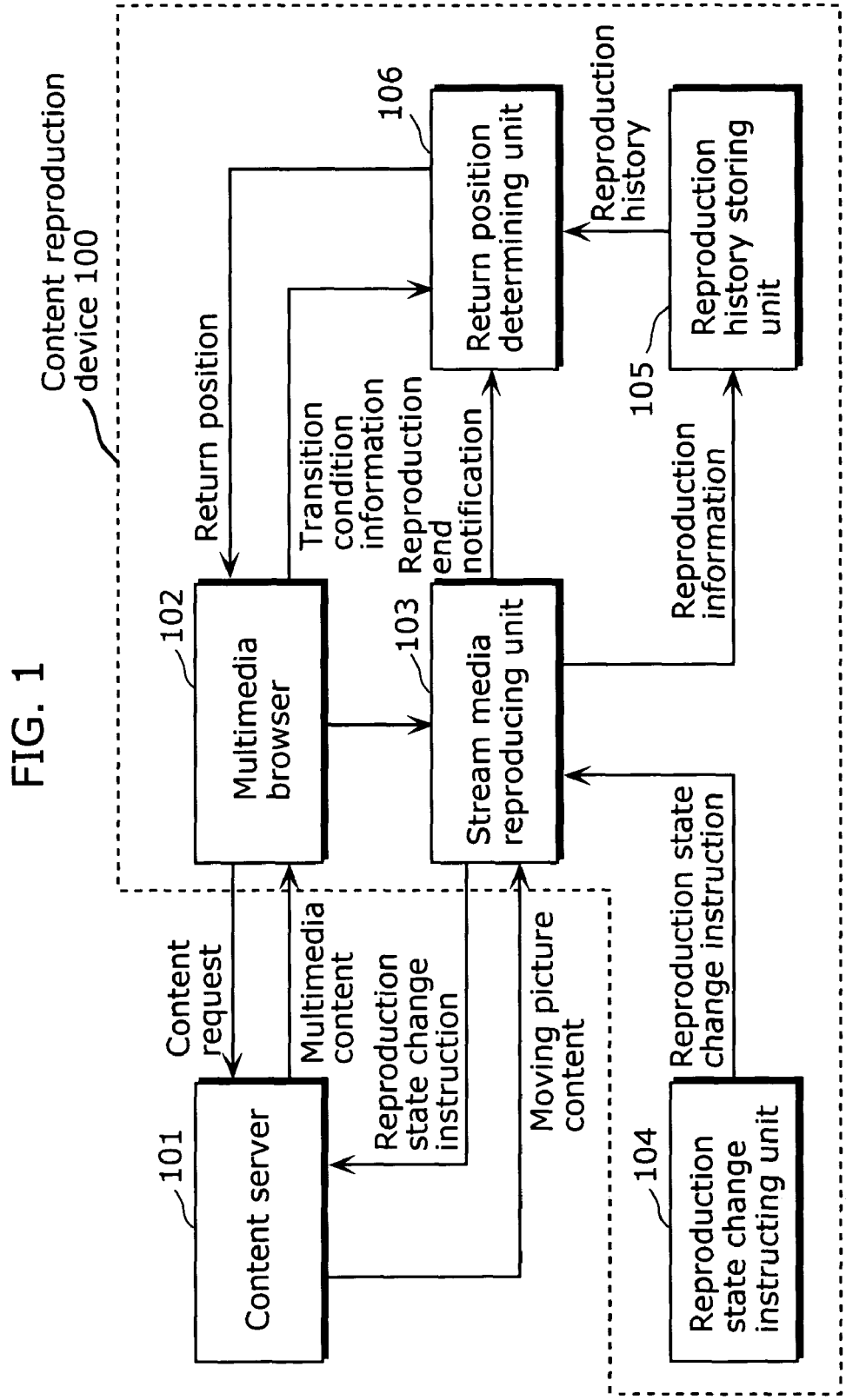
FIG. 1 is a diagram showing a structure of a content reproduction system and a functional structure of a content reproduction device, according to a first embodiment.

FIG. 1 is a diagram showing a structure of the content reproduction system and a functional structure of a content reproduction device 100, according to the first embodiment.

A content server 101 is an apparatus that transfers a multimedia content or a stream media content to the content reproduction device 100 according to a request from the content reproduction device 100.

The content server 101, as can be realized with the same technique as equipped in a WEB server that is normally used for the Internet today, receives the request from the content reproduction device 100 and returns a content specified in the request. Basically, in the case of transferring a multimedia content, communication is performed using HTTP, while in the case of transferring a stream media content, communication is performed based on streaming such as an RTP. Nevertheless, the stream media content may be downloaded using the HTTP, and then reproduced.

The content reproduction device 100 is a device which receives a content from the content server 101 and reproduces the content. Such content reproduction device 100 consists of the following: a multimedia browser 102 which displays a multimedia content; a stream media reproducing unit 103 which reproduces a stream media content; a reproduction state change instructing unit 104 which receives a user's instruction, e.g., fast-forward and stop, during the reproduction of the stream media content, and notifies the stream media reproducing unit 103 of the instruction; a reproduction history storing unit 105 which stores a reproduction history such as fast-forward and stop executed by the stream media reproducing unit 103; and a return position determining unit 106 which determines a return position such as a URI and a URL to be linked after the reproduction of the stream media content, based on the reproduction history information in the reproduction history storing unit 105 and transition condition information obtained from the multimedia browser 102.

The multimedia browser 102 being already known as an HTML browser technique in the world of Internet, and also as a BML browser technique in data broadcasting, a browsing function of the multimedia browser 102 can be realized using the conventional technique. When the reproduction of the stream media content is started by clicking a link destination to a moving picture while the multimedia browser 102 is reproducing a multimedia content, the multimedia browser 102 notifies the stream media reproducing unit 103 of a position at which the stream media content is to be reproduced and an instruction to reproduce the stream media content, and also notifies the return position determining unit 106 of transition condition information that is information related to a return position to be returned to when the reproduction of the stream media content is ended.

The stream media reproducing unit 103 has a function to reproduce a stream media content to be transmitted either by streaming from a server or by downloading, and can perform a special playback such as pause, fast-forward and stop depending on the type of stream media content. An instruction for such special playback is given under the assumption that the user gives the instruction via a remote control or a keyboard or the like, and the reproduction state change instructing unit 104 receives a user's instruction and notifies the stream media reproducing unit 103 of the instruction for special playback.

The stream media reproducing unit 103 performs special playback according to an instruction from the reproduction state change instructing unit 104, and notifies the reproduction history storing unit 105 of the special playback that has been performed each time a special playback is carried out. A history of reproduction instructions which are received from the stream media reproducing unit 103 is stored in the reproduction history storing unit 105.

After the reproduction of the stream media content is ended by the stream media reproducing unit 103, the return position determining unit 106 is notified of it, and the return position determining unit 106 determines a return position based on the transition condition information notified by the multimedia browser 102 when the reproduction of the stream media content is started, as well as the reproduction history stored in the reproduction history storing unit 105. Note that the processing of determining a return position executed by the return position determining unit 106 will be described later.

The return position determined by the return position determining unit 106 is notified to the multimedia browser 102, and then the multimedia browser 102 displays the content located at the return position.

It should be noted that, in FIG. 1, a single content server 101 and a single content reproduction device 100 are used in the description, however, plural content servers 101 and plural content reproduction devices 100 may be used, or the content server 101 may be equipped in the content reproduction device 100 as one of its functions. In such case, the content reproduction device 100 reproduces a content, for instance, by reading out the content stored in a hard disk or a storage medium such as a DVD.

The following describes an example of data description of the transition condition information for determining a return position in the content reproduction device according to the first embodiment.

FIG. 2 (*a*) is a reference diagram showing an example of data description of transition condition information in the case where a stream media content linked from a multimedia content is reproduced. In the example, the reproduction of the stream media content is specified using a normal HTML text, by linking to a URL of the stream media content using an anchor tag in a line in a link specification 201. However, with the content reproduction device according to the present invention, what is different from the link described in a normal HTML text is that the URL of the stream media content to be returned to is followed by two types of return URLs of "return URL1" and "return URL2" sectioned by a sign "#".

Both of the return URL1 and URL2 shown in the link specification 201 represent a URL of the content to be presented after the reproduction of a specified stream media content is ended.

The return URL1 presents the URL to be returned to in the case where the stream media content is thoroughly reproduced while the return URL2 presents the URL to be returned to in the case where the user did not view the whole stream media content since the stream media content is, for instance, fast-forwarded or stopped during the reproduction.

FIG. 2B is a reference diagram showing a table of transition condition information in the case of performing link specification using a table 202. In this case, two return URLs are specified by differentiating a transit destination URL and a return URL.

Note that, in the diagram, the sign "#" is used for sectioning the return URLs in the link specification 201, however, a different sign may be used. Such differentiation may be realized using a method of specifying the reproduction of the stream media content as an Application Program Interface (API) of the BML of data broadcast and then specifying a return position as its argument, as shown in FIG. 2 (*c*), or by using a table as shown in FIG. 2 (*b*).

Figure 3:
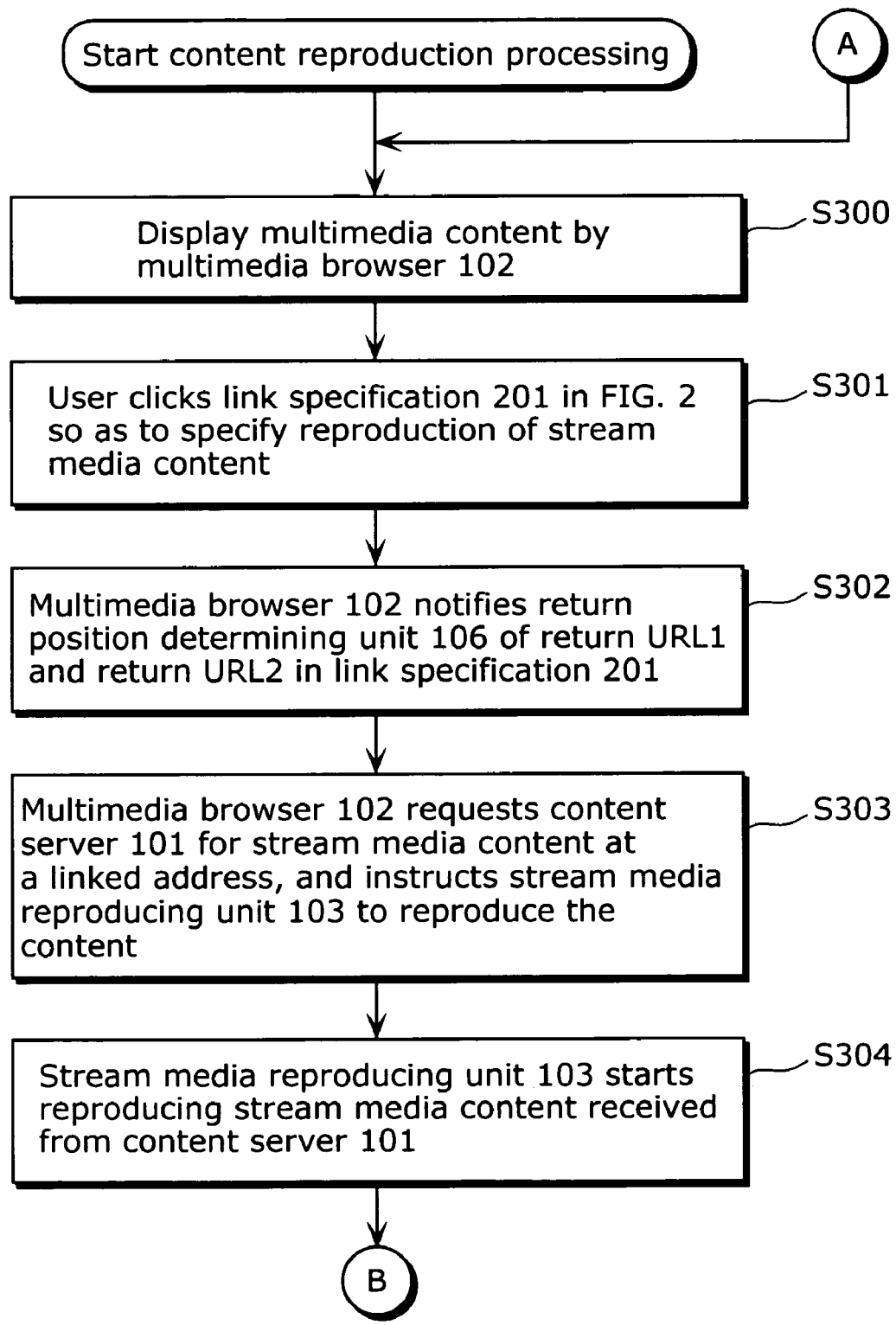
FIG. 3 is a flowchart showing an operational procedure used by the content reproduction device according to the first embodiment.
Figure 4:
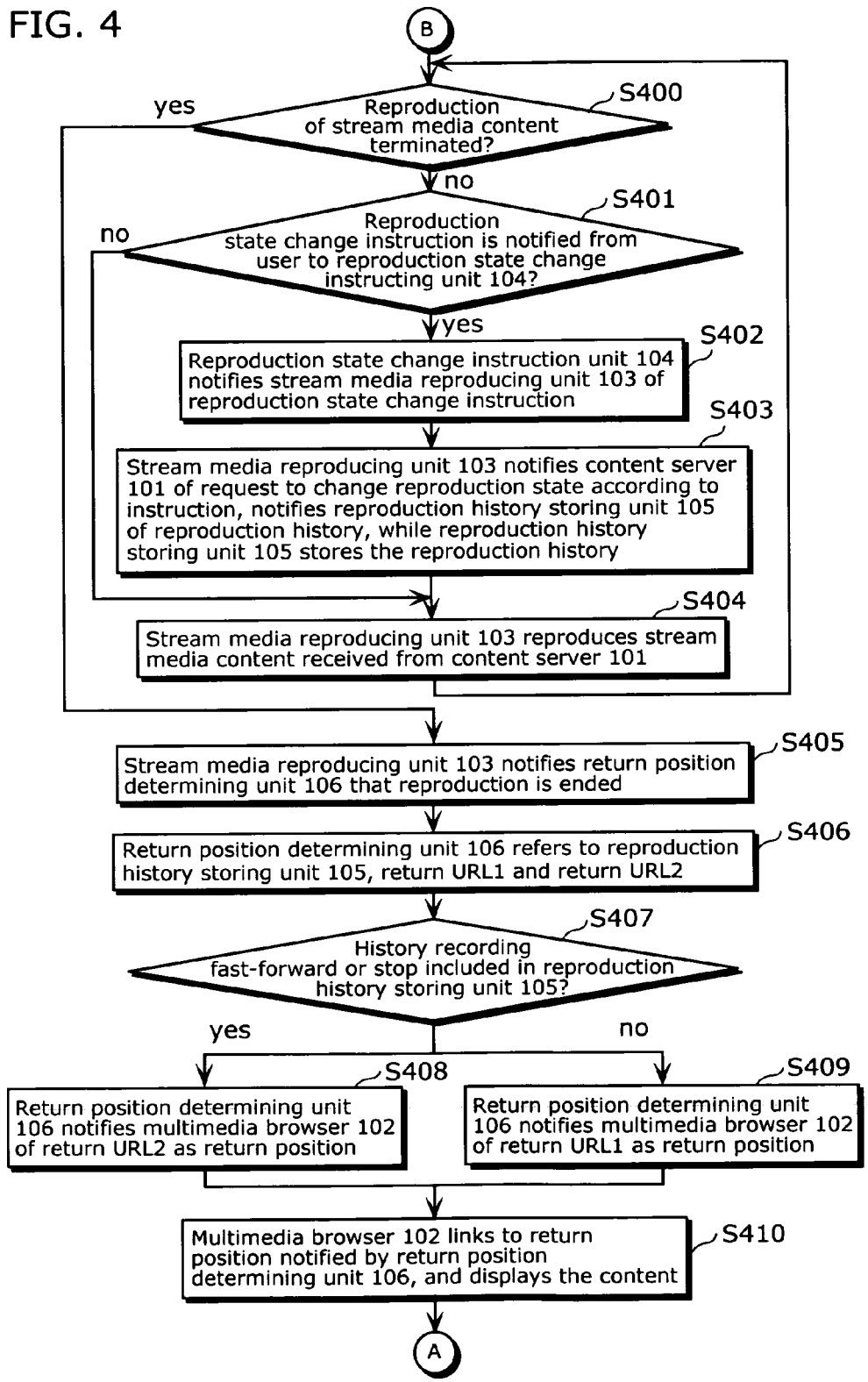
FIG. 4 is a flowchart showing an operational procedure used by the content reproduction device according to the first embodiment.

FIGS. 3 and 4 are flowcharts, each showing an operational procedure used by the content reproduction device according to the first embodiment. Note that A and B shown in FIGS. 3 and 4 are consecutive processing.

Firstly, when the user starts processing of reproducing a multimedia content, the multimedia browser 102 displays a multimedia content such as a web page (S300).

Then, after the user selects the link specification 201 and instructs for a reproduction of a stream media content via the multimedia browser 102 (S301), the multimedia browser 102 notifies the return position determining unit 106 of the return URL1 and the return URL2 as transition condition information (S302), requests the content server 101 to distribute a stream media content described in the link specification 201, and instructs the stream media reproducing unit 103 to reproduce the stream media content (S303).

Then, having received, from the multimedia browser 102, the instruction to reproduce the stream media content, the stream media reproducing unit 103 starts reproducing the stream media content transmitted from the content server 101 (S304). After the processing of S304 shown in FIG. 3 is executed, the processing shifts to S400 shown in FIG. 4.

The stream media reproducing unit 103 then judges whether or not the reproduction of the stream media content is ended (S400). Here, the termination of the reproduction of the stream media content indicates that the stream media content to be reproduced is reproduced till the end or that an instruction to stop the reproduction is given by the user during the reproduction.

In the case where the reproduction of the stream media content is not ended (No in S400), the stream media reproducing unit 103 judges whether or not the user has given a reproduction state change instruction to the reproduction state change instructing unit 104 being a remote control or the like (S401). Here, the reproduction state change instruction indicates a user's instruction such as stop, fast-forward, rewind and pause.

In the case where the user has given a reproduction state change instruction (Yes in S401), the reproduction state change instructing unit 104 notifies the stream media reproducing unit 103 that the reproduction state change instruction is received (S402).

Having received the notification that the reproduction state change instruction is received, the stream media reproducing unit 103 notifies the content server 101 of the request to change the reproduction state according to the instruction, and also notifies the reproduction history storing unit 105 of the reproduction state change information, while the reproduction history storing unit 105 stores the information (S403).

In the case of not receiving a reproduction state change instruction (No in S401), or after the processing presented in S403 is executed, the processing shifts to S404 so that the stream media reproducing unit 103 reproduces the data of the stream media content received from the content server 101.

In the case where the reproduction of the stream media content is ended (Yes in S400), the stream media reproducing unit 103 notifies the return position determining unit 106 that the reproduction of the stream media content is ended (S405).

Then, having received the reproduction end notification, the return position determining unit 106 refers to the history information which indicates a change made in the reproduction state and which is stored in the reproduction history storing unit 105, as well as the transition condition information being information about the return URLs described in the link specification at the time when the stream media content is reproduced (S406), and judges whether or not the reproduction history storing unit 105 has a history indicating fast-forward or stop (S407).

In the case where a history of fast-forward or stop is found (Yes in S407), the return position determining unit 106 notifies the multimedia browser 102 of the URL2 described after the second "#" in the link specification, as a return position (S408). In the case where a history of fast-forward or stop is not found (No in S407), the return position determining unit 106 notifies the multimedia browser 102 of the URL1 described after the first "#" in the link specification, as a return position (S409).

Then, the multimedia browser 102 is to repeat the processing of returning to S300 after displaying the content indicated by the URL specified by the return position that is received from the return position determining unit 106 (S410). Note that instead of specifying a content by a URL, a position of stored resource (e.g., BML text) may be directly specified.

It is also possible to specify the start of the reproduction of the stream media content, not a screen displaying a multimedia content. In such case, the processing does not shift to S300 after terminating the processing presented in S410, but to S302 as a result of the return URL being clicked.

In the present embodiment, the URL1 and URL2 are specified based on whether or not fast-forward or stop is found. The present invention is not limited to this, and it is applicable to the case where other types of change are made during the reproduction.

Figure 5:
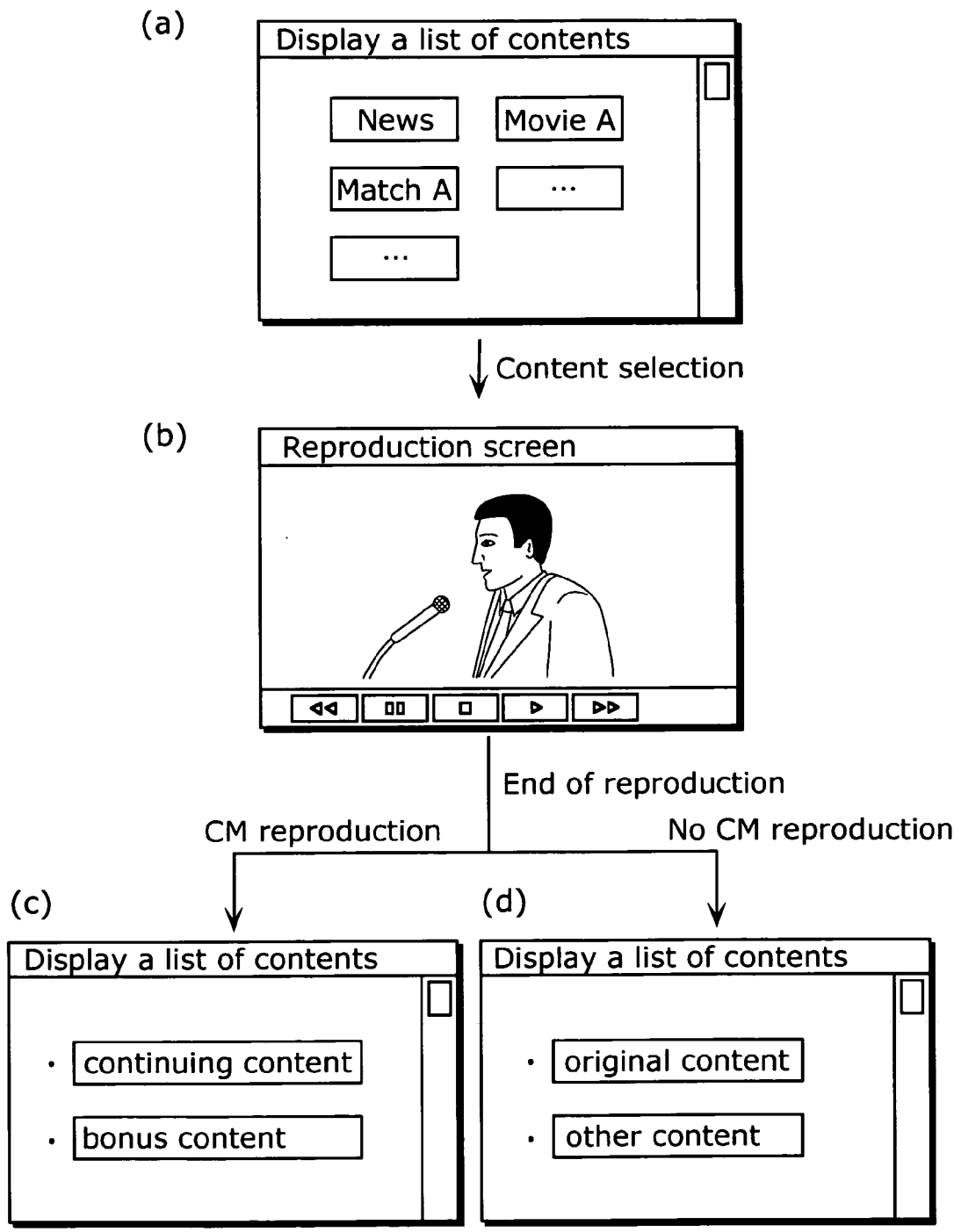
FIG. 5 is a reference diagram showing an example of a transition in a screen display performed by the content reproduction device according to the first embodiment.

FIG. 5 is a reference diagram showing an example of a transition of the screen display performed in the content reproduction device according to the first embodiment.

Firstly, in the case where the user reproduces a content, a multimedia content, in which a link destination in a moving picture content is described, is displayed on the multimedia browser screen (FIG. 5 (a)). On the screen of the multimedia content, a list of contents is displayed, for instance.

After the user selects a content he/she desires to reproduce, using a mouse and the like, software intended for a reproduction of stream media content such as a media player is activated so that the reproduction of the content is actually performed (FIG. 5 (b)). In this case, processing such as pause and fast-forward performed by the user via the reproduction state change instruction unit 104 such as a remote control is stored in the reproduction history storing unit 105, as a reproduction history.

In the case where the user terminated the reproduction, the return position determining unit 106 refers to the reproduction history stored in the reproduction history storing unit 105 as well as the transition condition information obtained from the server, judges whether or not a CM to be reproduced during the period of 5 to 10 minutes is reproduced. In the case where the CM is reproduced, the return position determining unit 106 displays a list of multimedia contents such as "continuing content" and "bonus content" (FIG. 5 (c)), and in the case where the CM is not reproduced, "original content" and "other content" are selectively displayed again (FIG. 5 (d)).

Thus, with the content reproduction device according to the first embodiment, it is possible to change the content to return to according to the state of the stream media content being reproduced by the user.

FIG. 6 is a reference diagram showing a multimedia content to be displayed on the screen according to the return position determined by the return position determining unit 106 in the content reproduction device 100 of the first embodiment.

Figure 6A:
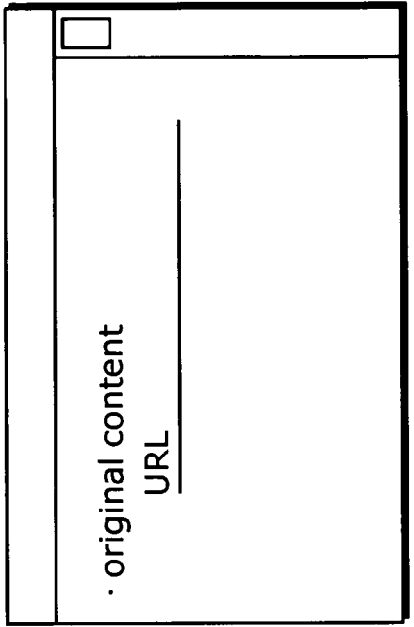
FIG. 6 is a reference diagram of a multimedia content to be displayed on a screen according to a return position determined by a return position determining unit in the content reproduction device according to the first embodiment.
Figure 6C:
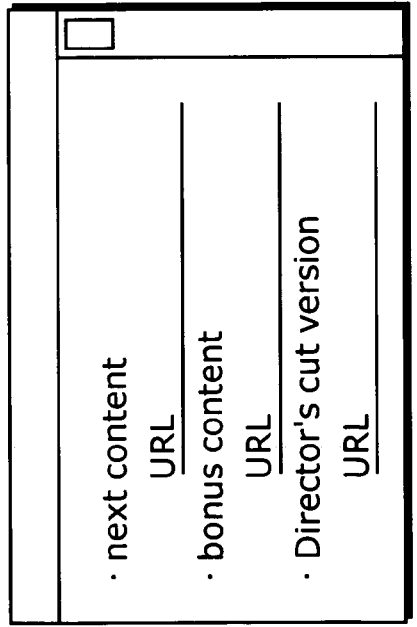
Figure 6B:
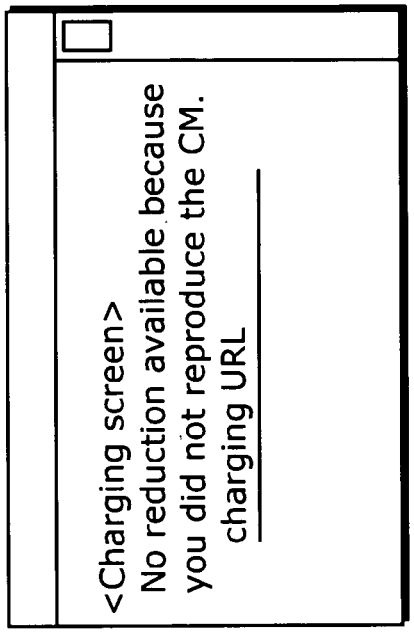

FIGS. 6A and 6B are reference diagrams showing a return position screen in the case where the reproduction is ended without any changes made to the state of the reproduction. On the display screen shown in FIG. 6A, contents such as "next content", "bonus content" and "Director's cut version" are displayed whereas on the display screen for charging processing shown in FIG. 6B, a transit destination for the processing of charging half price of the amount to be charged, since the user has viewed a CM.

Figure 6D:
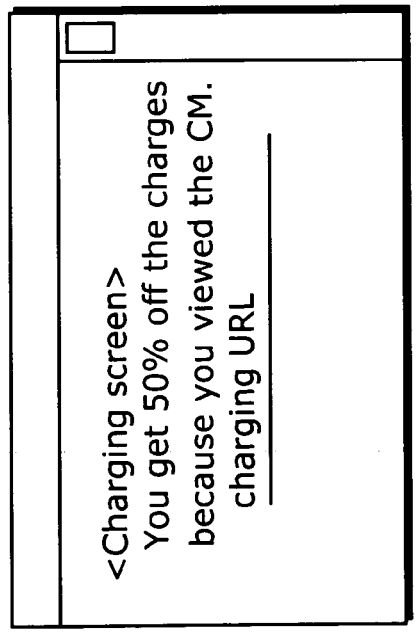

FIGS. 6C and 6D are reference screens in the case where the reproduction is ended while the content is fast-forwarded. On the display screen shown in FIG. 6C, "original content" is displayed whereas on the charging screen shown in FIG. 6D, the screen that is normally displayed for charging is displayed since the reproduction of the CM portion has been fast-forwarded.

Note that, as a display example of other multimedia content screen, in the case where the return position determining unit 106 refers to a reproduction history and judges that the scenes in which a team A attacks a team B in the match between the teams A and B, the screen may display a page for sales for items of the team A or a webpage that provides coupons for purchasing the items as a return position to come back after the reproduction is ended.

As has been described above, with the content reproduction device 100 according to the first embodiment, it is possible to change the multimedia content to be displayed next, according to the state of reproducing the content such as the case of viewing a stream media content from the beginning to the end and the case of fast-forwarding or stopping the content during the reproduction, when a stream media content such as a moving picture is reproduced after selecting a link destination in a multimedia content. Thus, a content provider can distribute contents with higher advertising effect.

It should be noted that, in the first embodiment, the return position determining unit 106 determines a return position based on the reproduction history stored in the reproduction history storing unit 105 and the transition condition information, and then notifies the multimedia browser 102 of the return position. It may be the multimedia browser 102 instead of the return position determining unit 106 that determines a return position based on the reproduction history stored in the reproduction history storing unit 105 and a return URL. Additionally, the multimedia browser 102 may not be equipped with the reproduction history storing unit 105 so as to directly receive reproduction information.

Second Embodiment

The following describes the content reproduction device 100 according to the second embodiment of the present invention, with reference to the diagrams. Note that the content reproduction device 100 according to the second embodiment is characteristic in that the return position determining unit specifies various return positions according to the change in the state of reproducing a content such as a moving picture.

FIG. 7 shows an example of the description of the transition condition information in the case where the content reproduction device according to the second embodiment reproduces a stream media content linked from a multimedia content. In the example, return URLs are described following the URL of the stream media content, which is a link destination and sectioned by the sign "#", as in the description example shown in FIG. 2. However, the present transition condition information differs from the one described in the first embodiment in that a return condition is described after a return URL and is sectioned by a sign "$", and that it is possible to describe more than three types of return URLs.

In FIG. 7A, a URL1 is specified as a return position URL in the case where a reproduction state of "STOP" is indicated as the return condition, a URL2 is specified as a return position URL in the case where "FF00:05:00-00:10:00" is indicated as the return condition, and a URL3 is specified as a return position URL in the case where "FF00:30-" is indicated as the return position.

FIG. 7B shows a display example of a table of transition condition information in the case where a link is specified using a table 702, and a relationship between return URLs of more than three types and the corresponding return conditions is described in the description of the multimedia content, as is the case of FIG. 7A.

FIG. 8 is a reference diagram showing a description example of a return condition for determining a return position in the return position determining unit 106. Note that normal expressions are used for presenting the description example of a return condition in the present diagram. As shown in the diagram, the return condition is represented by "COMMAND, TERM, DURATION", and "COMMAND" is necessary among repetition units, but "TERM" AND "DURATION" may not necessarily be described.

Among the descriptions, "COMMAND" presents a command for changing the state of reproducing a content and is represented by one of "STOP", "FF", "REW" AND "PAUSE". "STOP" denotes that the content reproduction is stopped, "FF" denotes that the content reproduction is fast-forwarded, "REW" denotes that the content reproduction is rewound, and "PAUSE" denotes that the content reproduction is paused. A sign "!" that is inserted immediately before "COMMAND" indicates a condition in the case where a command to be executed is not actually executed.

"TERM" presents a period during which a condition is valid, basically in the form of "hh:mm:ss-hh:mm:ss". For example, when "00:05:00-00:10:00" is described, the condition is valid in the case where an operation indicated as "COMMAND" is carried out during 5 to 10 minutes after the start of the reproduction of a stream media content.

"TERM" may be described as a period before hh:mm:ss and a period after hh:mm:ss. In such case, the period may be expressed by omitting the time after "-" or the time before "-". For example, "-00:10:00" presents a duration from the start of the stream media content until the time indicating the 10th minute after the start of the content, while "00:30:00-" presents a duration from the time indicating the 30th minute after the start of the content until the end.

"DURATION" presents a period during which the command was being executed, and an integer is described at every second. For example, in the case where "FF 100-" is described, the condition is valid in the case where a content is fast-forwarded for 100 seconds or longer.

It should be noted that, in the second embodiment, the smallest unit for representing "TERM" and "DURATION" is second, however, a unit smaller than a second such as a millisecond can be surely used.

FIG. 7 includes a link specification 701 which is described based on the description method described above, and is linked to a stream media content. The URL of the stream media content is firstly described as a link destination, which is followed by a return URL1 with the sign "#" for sectioning the URLs. "STOP" is described as a condition for a transition to the return URL1 with the sign "$" for sectioning the return URL1 and the condition, which shows that the return URL1 is the next to be reproduced in the case where the user has stopped the reproduction of the stream media content.

Sectioned by the sign "#", a return URL2 is described together with a condition. The condition being "!FF00:05:00-00:10:00", the condition will be true in the case where a period of the fifth to the tenth minute of the stream media content is not fast-forwarded. A condition of a return URL3 being "FF 30-", the condition will be true in the case where the content is fast-forwarded for the period of 30 seconds or longer after the reproduction of the stream media content is started.

In the second embodiment, the return position determining unit 106 defines a return position as the URL that is firstly corresponded to the condition in examining, from the beginning, the return URLs described in the link specification. In the case where plural URLs correspond to the condition, the URLs may be presented to the user for selection. In the case where no URLs correspond to the condition, the linked URL may be predetermined using a default, or the content that is presented before the transition to the stream media content may be reproduced.

FIG. 9 is a reference diagram showing an example of reproduction history data 900 to be stored in the reproduction history storing unit 105.

The diagram shows a history of reproducing a stream media content since the beginning. After the start of the reproduction, the content is fast-forwarded two times: one time from fifth to seventh minute after the start (902) and the other time from thirty-fifth to fortieth minute and a half (903), immediately rewound at the fortieth minute and a half (904) back to the fortieth minute, and paused at the forty-fifth minute (905).

Note that "START" (901) indicating that the reproduction of the stream media content is started shall be, in any case, firstly recorded in the reproduction history. Since "START" merely indicates that the reproduction of the stream media content is started, an operational timing is not to be particularly recorded.

According to the first embodiment, the return position determining unit 106 determines a return position based on whether or not the content is paused or fast-forwarded during the reproduction of the stream media content, as shown in FIG. 4. However, the return position determining unit 106 according to the second embodiment differs from the one described in the first embodiment in that the former has additional processing of judging whether or not a condition correspond to a return URL due to the fact that a condition is set for each return URL.

Figure 10:
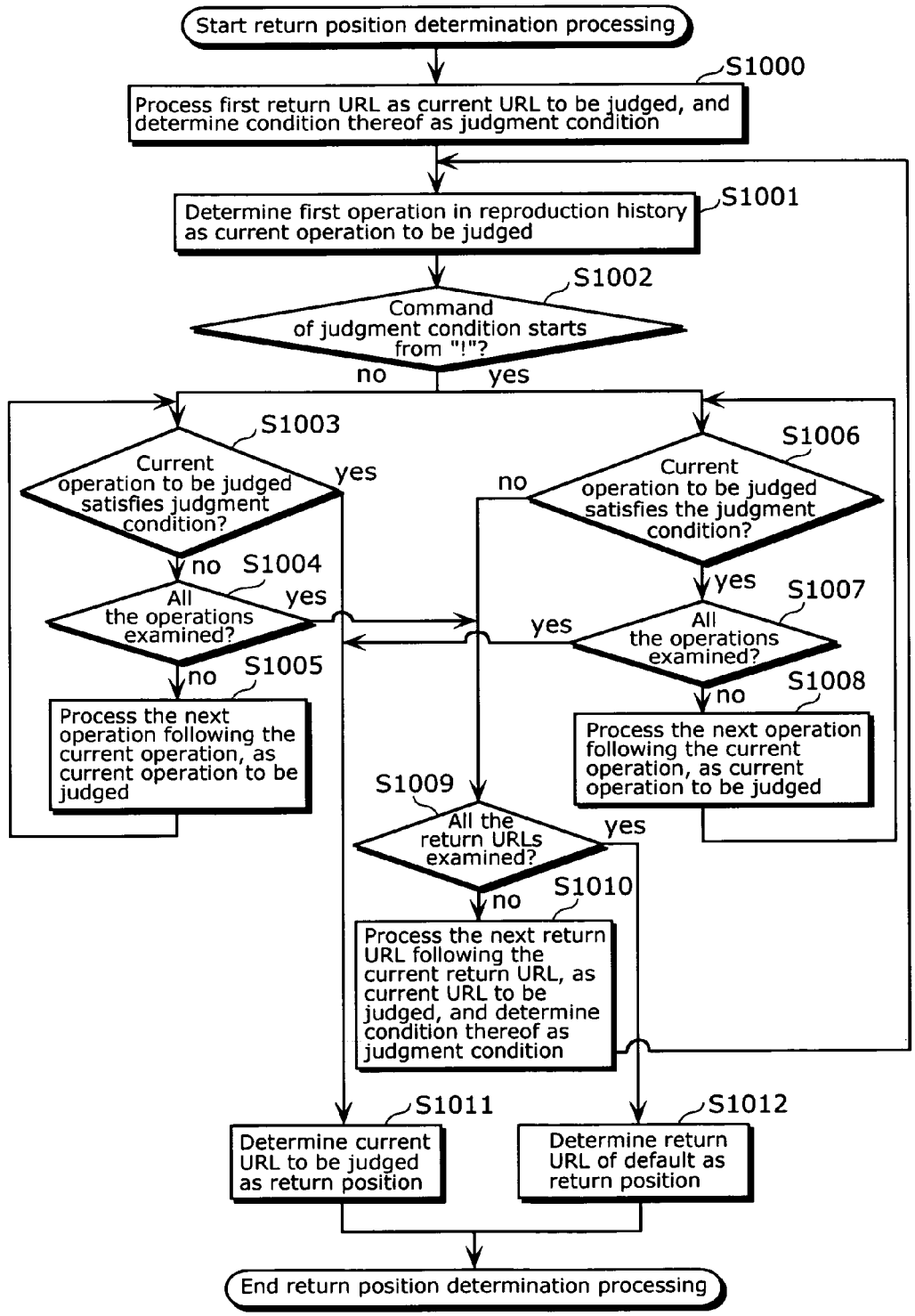
FIG. 10 is a flowchart showing a processing procedure for the return position determining unit to determine a return position URL, according to the second embodiment.

FIG. 10 is a flowchart showing a procedure used by the return position determining unit 106 to determine a return position URL.

When the reproduction of the stream media content is ended and the return position determination processing starts, the return position determining unit 106 firstly sets, as the current URL, the first return URL described in the original link instruction used for a transition to the stream media content, defines, as the judgment condition, the condition that follows the sign "$" after the return URL (S1000), and moves to S1001.

The return position determining unit 106 then determines, as the current operation, the first operation described in the reproduction history stored in the reproduction history stored in the reproduction history storing unit 105 (S1001).

Next, the return position determining unit 106 judges whether or not a command indicating a judgment condition starts with the sign "!" (the condition in the case where the command to be executed is actually not executed) (S1002).

In the case where the command indicating the first judgment condition in the reproduction history does not start with the sign "!" (No in S1002), the return position determining unit 106 judges whether or not the current operation satisfies the judgment condition (S1003). In the case where the condition is satisfied (Yes in S1003), the processing shifts to S1011 and is ended after determining the current URL as a return position.

In the case where the condition is not satisfied (No in S1003), the return position determining unit 106 judges whether or not all the operations indicated in the reproduction history are examined as the current operation (S1004).

In the case where not all the operations are examined (No in S1004), the next operation to be judged following the current operation is set as the current operation, based on the reproduction history (S1005), and the processing shifts to S1003. In the case where it is judged, under the judgment condition used at that time, that all the operations are respectively examined as the current operation to be judged (Yes in S1004), the return position determining unit 106 judges whether or not all the return URLs described in the link specification are examined (S1009). In the case of "Yes" in S1009, the return position determining unit 106 sets a return URL of a default as a return position and terminates the processing (S1012).

In the case where not all the return URLs are examined (No in S1009), the return position determining unit 106 sets, as a new current URL, the return URL described after the current return URL, sets the condition of the newly-set URL as a judgment condition (S1010), and moves to S1001.

In the case where the command of the judgment condition starts with the sign "!" (Yes in S1002), the return position determining unit 106 judges whether or not the current operation satisfies the judgment condition (S1006).

In the case where the current operation satisfies the judgment condition (Yes in S1006), it is determined whether or not all the operations described in the reproduction history have already been examined (S1007). In the case where all the operations have been examined (Yes in S1007), the return position determining unit 106 determines the current URL as a return position (S1011), and terminates the processing.

In the case where not all the operations are examined (No in S1007), the return position determining unit 106 sets the next operation following the current operation as a new current operation to be judged (S1008), and moves to S1006.

The following describes a concrete example of the processing of determining a return position in the case where the reproduction of the stream media content is ended, after the link specification shown in FIG. 7 is selected and the operation indicated in the reproduction history shown in FIG. 9 is executed.

After the reproduction of the stream media content is ended, the return position determining unit 106 determines the first return URL1 as a current URL to be judged in S1000, and determines the condition "STOP" as a judgment condition.

Then, the return position determining unit 106 moves to S1001, and determines the START operation being the first operation in the reproduction history, as the current operation. The judgment in S1002 being "no", the return position determining unit 106 moves to S1003. The judgment condition being "STOP", the return position determining unit moves to S1004. Since, at this point, not all the operations are examined, the return position determining unit 106 sets, as "FF(5-7)", the current operation, and then moves to S1003.

If the current operation "FF(5-7)" is not satisfied, the return position determining unit 106 moves to S1004. At this point, since not all the operations are examined, the return position determining unit 106 moves to S1005.

Since no operations correspond to the judgment condition in the execution of the same processing for all the operations indicated in the reproduction history 7, the judgment is "yes" in S1004, so that the processing shifts to S1009.

In S1009, the return position determining unit 106 judges whether or not all the return URLs are examined, moves to S1010 since a return URL that needs to be examined still remains at this point. The return position determining unit 106 then determines the return URL2 being the next return URL following the current return URL, as the current URL, and the condition "!FF 00:05:00-00:10:00" indicated in the return URL2, as the judgment condition. The judgment condition is satisfied in the case excepting the case of fast-forwarding during a period between the fifth and tenth minute. After that, the processing shifts to S1001.

In S1001, the first operation "START" in the reproduction history is determined again as the current operation, and the processing shifts to S1006 since it is judged as "yes" in S1002.

The current operation being "START" and the judgment condition being satisfied, the processing shifts to S1007. In S1007, the return position determining unit 106 judges as "no" since the unexamined operation still remains in the reproduction history, determines, in S1008, the next operation of "FF (5-7)" as the current operation, and moves to S1006.

Since the current operation does not satisfy the judgment condition in S1006, the processing shifts to S1009. At this point, an examined return URL still remains so that the return position determining unit 106 judges as "no" in S1009, and determines, in S1010, the next return URL as the current URL and determines the condition "FF 30-" as the judgment condition, and moves to S1001. The judgment condition is true in the case where the content is fast-forwarded for a period of 30 seconds or longer.

The return position determining unit 106 determines in S1001, as is the previous case, the first operation in the reproduction history as the current operation, judges as "no" in S1002, and moves to S1003. After the execution of the processing indicated in S1004 and S1005, the current operation is determined as "FF (5-7)" and the judgment of "yes" is made in S1003, the processing S1011. In S1011, the return position determining unit 106 determines, as a return position, the return URL3 that is the current URL to be judged at that time, and terminates the return position determination processing. Note that the condition such that a content is fast-forwarded for 30 seconds or greater as presented by "FF 30-" may apply not only to the case where one fast-forwarding operation amounts to 30 seconds or greater, but also to the case where a total amount of fast-forwarding time amounts to 30 seconds or greater during the reproduction of the stream media content.

As described above, when the content reproduction device according to the second embodiment reproduces a stream media content linked from a multimedia content, the return position determining unit 106 can judge whether or not a URL satisfies a condition according to the state of reproducing various stream media content. This is because a condition is set for each return URL. It is therefore possible to change, in various ways, the return position to be displayed next as a multimedia content.

It should be noted that, in the second embodiment, the return position determining unit 106 determines a return position based on the reproduction history stored in the reproduction history storing unit 105 and the transition condition information in which a URL is described, and then notifies the multimedia browser 102 of the determined return position. However, the multimedia browser 102 may determine a return position based on the reproduction history stored in the reproduction history storing unit 105 and a return URL. Furthermore, the multimedia browser 102 may directly receive and store reproduction information, without being equipped with the reproduction history storing unit 105.

In the second embodiment, a sign "#" is used for sectioning return URLs in the link specification 501 and a sign "$" for sectioning a return URL and a return condition, respectively. Different signs may be surely used or another method such as having a table may be employed for sectioning a transit destination URL and a return URL so as to specify such return URL and a return condition.

In addition, plural numbers of "COMMAND TERM DURATION" which are sectioned by "AND" or "OR", as a return URL shown in FIG. 8, may be placed. This also enables a clarification of an order of placing the conditions using parentheses. In such case, a condition to return to the current return URL in the return position determination processing is each condition sectioned by "AND" or "OR" resulted from a logical expression using "AND" and "OR".

Third Embodiment

The following describes the content reproduction device according to the third embodiment of the present invention. A stream media reproducing unit 103 in the content reproduction device according to the third embodiment receives an instruction to change a state of reproducing a content, and then notifies the return position determining unit of the operational information instead of the reproduction history storing unit.

Figure 11:
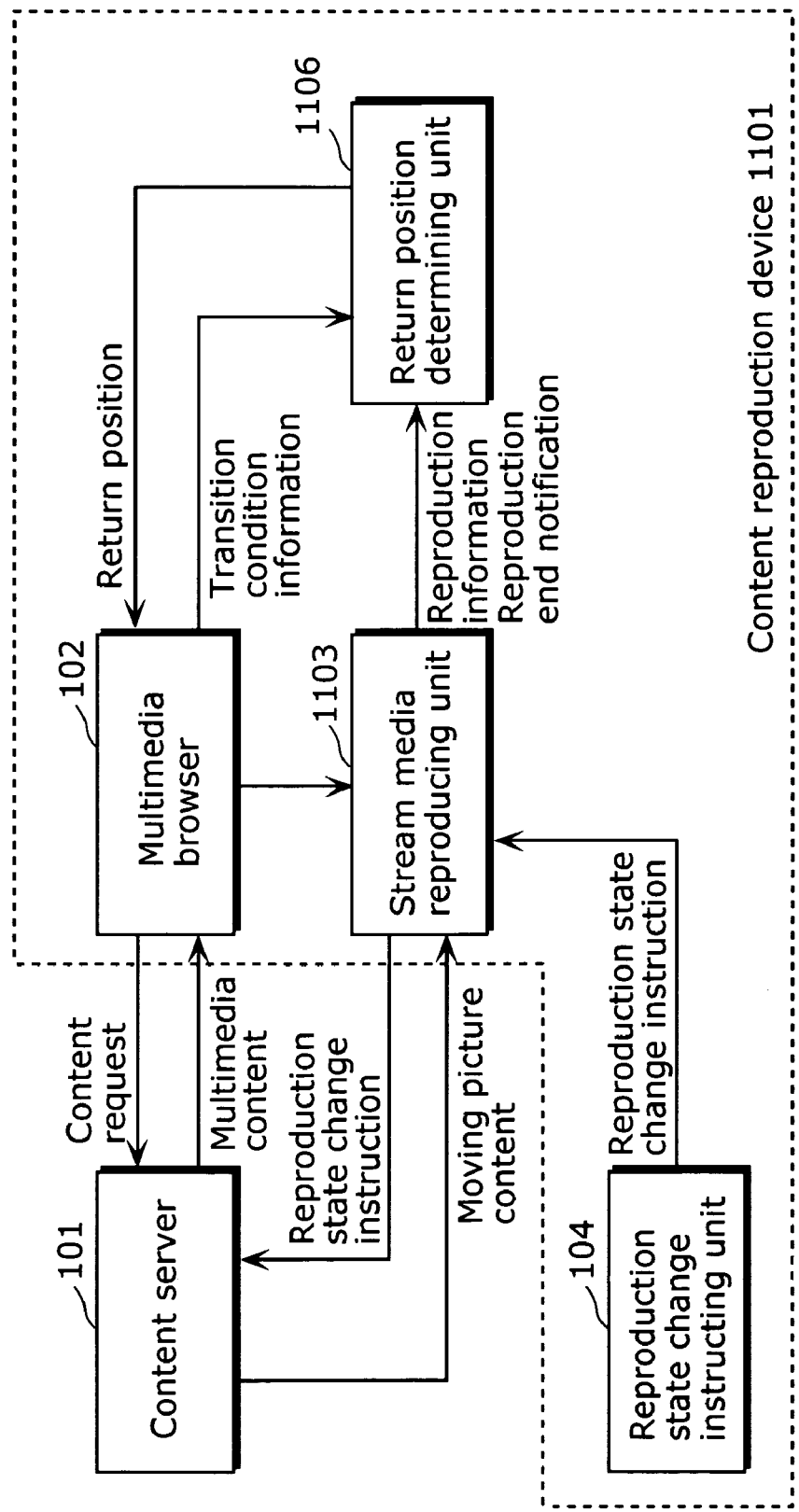
FIG. 11 shows a structure of a content reproduction system and a functional structure of a content reproduction device 1101, according to a third embodiment.

FIG. 11 shows a structure of the content reproduction system and a functional structure of a content reproduction device 1101, according to the third embodiment. Note that the structure of the content reproduction device 1101 according to the third embodiment differs from the structure described in the first and second embodiments in that the reproduction history storing unit may not be equipped in the device. It should be also noted that the same numbers are assigned to the same components as described in each of the above embodiments, and the detailed description will not be repeated.

A return position determining unit 1106 changes the state of reproducing a content each time the operational information is received from the stream media reproducing unit 1103, determines a return position when the reproduction of the stream media content is ended, and notifies the multimedia browser 102 of the determined return position.

The following describes a change in the state when the return position determining unit 1106 receives the operational information, and describes the processing of determining a return position.

FIG. 12 is a flowchart showing a procedure used by the return position determining unit 1106 in the content reproduction device 1101 according to the third embodiment, from when a reproduction of a stream media content is started until the reproduction is ended.

When the reproduction of the stream media content starts, the return position determining unit 1106 firstly considers all the return URLs at the time when the stream media content is linked to, as current URLs to be examined, and determines URLs which start with a sign "!" among them, as candidate return position URLs (S1200). Note that in the case of plural conditions starting with the sign "!", a candidate return position URL shall be chosen based on certain criteria (e.g., firstly described). The candidate return position URLs are to be included in the current URLs to be examined.

Then, in the case where a reproduction end notification is not received (No in S1201), the return position determining unit 1106 judges whether or not a reproduction state change notification is received from the stream media reproducing unit 1103 (S1202). In the case where the state reproduction state change notification is not received (No in S1202), the return position determining unit 1106 returns to S1201.

In the case where the reproduction state change notification is received (Yes in S1202), the return position determining unit 1106 performs the processing described in S1203 through S1208 on all the current URLs to be examined.

The return position determining unit 1106 firstly judges whether or not a return condition of the current URL starts with the sign "!" (S1203). In the case where the return condition starts with the sign "!" (Yes in S1203), the return position determining unit 1106 moves to S1207. In the case where the return condition does not start with the sign "!" (No in S1203), the return position determining unit 1106 compares the operation received in S1202 and the return condition of the current URL (S1204). In the case where the operation corresponds to the return condition (Yes in S1204), the return position determining unit 1106 excludes the return URLs which are described after the current URL from the current URLs to be examined (S1205), and sets the current URL to be a candidate return URL (S1206). In the case where the operation does not correspond to the return condition (No in S1204), the return position determining unit 1106 performs loop process starting from S1203 on the next return URL as the current URL. In the case where no return URL is to be processed next, the return position determining unit 1106 returns to S1201.

In the case where the return condition of the current URL starts with the sign "!" (Yes in S1203), the return position determining unit 1106 judges whether or not the received operation corresponds to the condition obtained by extracting the sign "!" from the return condition (S1207). In the case where the received operation corresponds to the return condition without "!" (Yes in S1207), the return position determining unit 1106 excludes the current URL from the URLs to be examined (S1208). The processing of S1208 and thereafter or the processing to be performed in the case of "no" in S1207, is as same as the processing of S1206 and thereafter.

In the case of receiving a reproduction end notification (Yes in S1201), the return position determining unit 1106 judges whether or not a candidate return position URL exists (S1209). In the case where such candidate return position URL exists, the return position determining unit 1106 determines, as a return position, the URL that is firstly described among the candidate return position URLs (S1210). In the case where such candidate return position URL does not exist (No in S1209), the return position determining unit 1106 determines a default URL as a return position (S1211), and terminates the reproduction of the stream media content.

The following describes a procedure used in the case of selecting the link instruction shown in FIG. 7 as described above as a concrete example, and executing a stream media content with the operation shown in FIG. 9.

When the reproduction of the stream media content starts based on the link specification in FIG. 7, the return position determining unit 1106 determines, in S1200, that all the return URLs are to be examined and that a URL of which a return condition starts with the sign "!" is a candidate return position URL. In the case of the link specification 501 shown in FIG. 7, the URLs to be examined are a return URL1, a return URL2 and a return URL3, . . . .

In the case reproducing a stream media content with the operation shown in FIG. 9, it is notified that a period between the fifth to seventh minute of the content is fast-forwarded (Yes in S1202). The processing then shifts to the loop process to be performed on each URL to be examined. Since the return condition of the first URL is "STOP", the judgment in S1204 is "no" and the return URL2 is determined as the next current URL to be judged, and the processing shifts to S1203.

The return condition of the return URL2 is "!FF(5-10)" so that the judgment in S1203 is "yes" and the processing shifts to S1207. Since the operation is "FF(5-7) and the condition is "FF(5-10)", the condition is satisfied and the judgment in S1207 is "yes", and the processing shifts to S1208.

In S1208, the return URL2 that is the current URL is excluded from the current URLs to be examined. Also, at the exclusion, the return URL2 is excluded from the candidate return URLs as well.

The return position determining unit 1106 then determines the return URL3 as the next current URL to be judged, and moves to S1203. As for the return URL3, judgments are "no" in S1203 and "yes" in S1204, therefore, the return position determining unit 1106 excludes the return URLs described after the return URL3 from the current URLs to be examined, and sets, in S1206, the return URL3 as a candidate return position URL.

At this point, the examination of all the URLs to be examined is terminated so that the processing returns again to S1201. In the same way, the return position determining unit 1106 executes the processing described in S1203 through S1208 for the return URL1 and return URL3 with regard to each operation of 903, 904 and 905 shown in FIG. 9, and moves to S1201.

After the reproduction of the stream media content is ended, the judgment in S1201 is "yes" and the processing shifts to S1209. In S1209, the return URL3 being a candidate return URL, the return position determining unit 1106 moves to S1210 and determines the return URL3 as a return position.

FIG. 13 is a diagram showing a transition of the reproduction state in the content reproduction device 1101 according to the third embodiment.

Figure 13A:
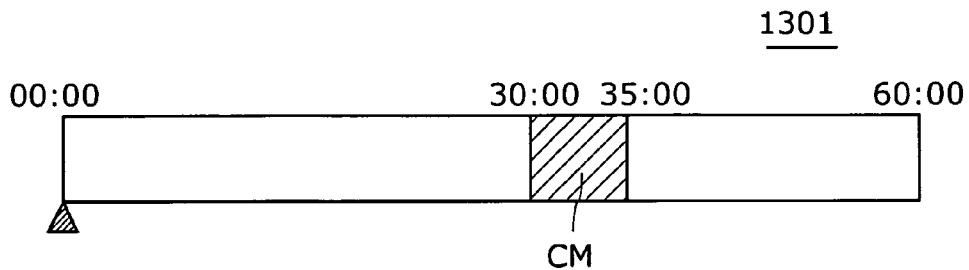
FIG. 13 shows a transition diagram showing a state of reproduction performed in the content reproduction device according to the third embodiment.

FIG. 13A shows a video stream of the content to be reproduced by the content reproduction device 1101, and the video content contains a CM that is inserted into a period between the thirtieth to thirty-fifth minute of the content.

The transition condition information to be obtained from the content server 101 via the multimedia browser 102 describes that a transition to "URL1" is carried out in the case of entirely reproducing a content from the beginning, a transition to "URL3" is performed in the case of executing "STOP" during the reproduction of the content, a transition to "URL2" is performed in the case where a period between the thirtieth to thirty-fifth minute of the content is fast-forwarded and the rest of the content is reproduced after that, and a transition to "URL3" is carried out in the case where a period between the thirtieth to thirty-fifth minute of the content is fast-forwarded, the rest of the content is reproduced after that, and then "STOP" is performed.

Figure 13B:
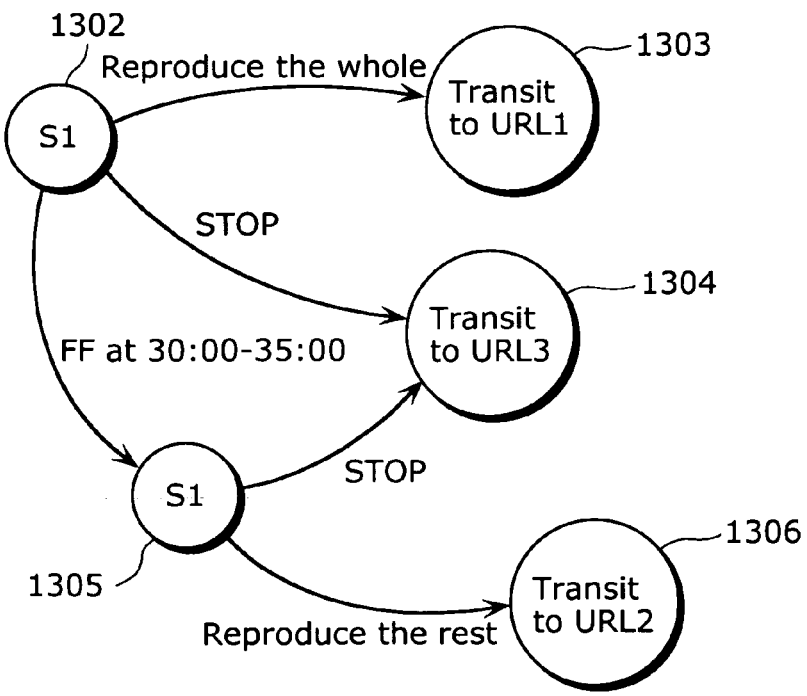

As shown in FIG. 13B, when the reproduction of the stream media content starts in S1 (1302), the return position determining unit 1106 obtains a reproduction state, and transits to URL1 (1303) in the case where the whole content is reproduced, but transits to URL3 (1304) in the case where "STOP" is executed during the reproduction. In the case where the content is fast-forwarded during a period between the thirtieth to the thirty-fifth minute, the return position determining unit 1106 transits to S1 (1305). In the case where the processing "STOP" is executed after the content is fast-forwarded during the period between the thirtieth to the thirty-fifth minute, the return position determining unit 1106 transits to URL3 (1304), and in the case where the rest of the content is reproduced after the content is fast-forwarded during the period between the thirtieth to the thirty-fifth minute, the return position determining unit 1106 transits to URL2 (1306).

As described above, in the case of reproducing a stream media content linked from a multimedia content, the content reproduction device according to the third embodiment can change the next content to be reproduced, according to the state of reproducing the stream media content.

As in the second embodiment, it should be noted that, with the content reproduction device 1101 according to the third embodiment, a form for describing a return URL and a return condition may be changed and a return condition may be described using a logical expression in the description of the link instruction for the stream media content, and the multimedia browser instead of the return position determining unit may determine a return position.

In the third embodiment, the stream media reproducing unit 1103 may execute the state for determining a return position each time the stream media reproducing unit 1103 receives a reproduction state change instruction, determine a return position and notify the !multimedia browser 102 of the determined return position.

The transition condition table used in the description of each of the embodiments described above may be created by the server apparatus and then directly transmitted to the content reproduction device, or may be transmitted to the content reproduction device via another apparatus after the table is created by the server apparatus.

The content reproduction device of the present invention is useful, for example, as a PC that reproduces a stream media content such as a moving picture linked from a multimedia content such as a web page obtained via a broadband Internet. The present reproducing apparatus is also suitable for a content reproduction device which reproduces a multimedia content and a stream media content obtained not only via the Internet, but also via a hard disk such as an Intranet, a home-LAN, and a storage medium such as a DVD.

The invention claimed is:

1. A content reproduction device that reproduces a stream media content that is linked to from a multimedia content written in a markup language used for Web browsing, wherein a state of the reproduction of the stream media content can be changed according to an instruction by a user and the reproduction of the stream media content is performed for a predetermined consecutive period of time, the content reproduction device comprising:

a display unit operable to display the multimedia content;

a reproducing unit operable to reproduce the stream media content that is linked to from the displayed multimedia content;

a reproduction state change accepting unit operable to accept, from the user, reproduction state change information indicating a change in the state of the reproduction of the stream media content by the reproducing unit; and a return position determining unit operable to determine, based on the reproduction state change information, whether or not all of the stream media content has been reproduced by the reproducing unit, wherein, when the return position determining unit determines that all of the stream media content has been reproduced, the return position determining unit determines, as a first return position, a return position indicating a portion of the multimedia content to be displayed when transitioning from reproducing the stream media content back to displaying the multimedia content when the reproduction of the stream media content by the reproducing unit has ended, wherein, when the return position determining unit determines that all of the stream media content has not been reproduced, the return position determining unit determines, as a second return position, a return position that is different from the first return position, and wherein the display unit (i) displays the determined first return position of the multimedia content when the return position determining unit determines that all of the stream media content has been reproduced, and (ii) displays the determined second return position of the multimedia content when the return position determining unit determines that all of the stream media content has not been reproduced.

2. The content reproduction device according to claim 1, wherein the return position determining unit is operable to obtain a transition condition table describing a relationship between the state of the reproduction of the stream media content and the determined return position, such that the determined return position is determined based on the transition condition table and the reproduction state change information.

3. The content reproduction device according to claim 2, further comprising a storing unit in which the multimedia content, the stream media content, the transition condition table and the accepted reproduction state change information are stored, wherein the reproducing unit is operable to reproduce the stored stream media content, wherein the display unit is operable to display the stored multimedia content, and wherein the return position determining unit is operable to determine the return position based on the stored transition condition table and the stored reproduction state change information.

4. The content reproduction device according to claim 2, further comprising a receiving unit operable to receive, from a server via a network, the multimedia content, the stream media content and the transition condition table, wherein the reproducing unit is operable to reproduce the received stream media content, wherein the display unit is operable to display the received multimedia content, and wherein the return position determining unit is operable to determine the return position based on the received transition condition table and the accepted reproduction state change information.

5. The content reproduction device according to claim 2, wherein the reproduction state change information includes at least one of stop, fast-forward, rewind and pause as the change in the state of the reproduction, and includes time information indicating a time when the change in the state of the reproduction is made, and wherein the return position determining unit is operable to determine, with reference to the state of the reproduction that corresponds to the time information, the return position based on whether or not a transition condition described in the transition condition table is satisfied.

6. The content reproduction device according to claim 2, wherein the return position determining unit is operable to determine, as the return position, a default return position that is previously determined or determined without conditions, in a case when the return position corresponding to the reproduction state change information is not described in the transition condition table.

7. The content reproduction device according to claim 2, further comprising a reading unit operable to read, via a storage medium, at least one of the stream media content, the multimedia content, and the transition condition table.

8. The content reproduction device according to claim 2, wherein the determined return position includes at least two different URLs.

9. The content reproduction device according to claim 1, wherein the determined return position includes at least two different URLs.

10. The content reproduction device according to claim 1, wherein at least a first content and a second content are included in the multimedia content to be displayed by the display unit after the reproduction of the stream media content has ended, and wherein the display unit is operable (a) to display the first content in a case when the reproduction state change information is accepted before the reproduction of the stream media content has ended, and (b) to display the second content in a case when the reproduction state change information is not accepted until the reproduction of the stream media content has ended.

11. The content reproduction device according to claim 10, wherein the display unit is operable (a) to display the first content in a case when the reproduction state change information includes one of fast-forward and stop, and (b) to display the second content in a case when the reproduction state change information includes neither of fast-forward and stop.

12. The content reproduction device according to claim 1, further comprising a reproduction history storing unit that holds a history of the reproduction state change information, wherein, upon receiving the reproduction state change information from the reproduction state change accepting unit and changing the state of the reproduction, the reproducing unit is operable to notify the reproduction history storing unit of the reproduction state change information, and wherein, after the reproduction of the stream media content has ended, the return position determining unit is operable to read the history of the reproduction state change information held in the reproduction history storing unit, and to determine the return position.

13. The content reproduction device according to claim 1, wherein, upon receiving the reproduction state change information from the reproduction state change accepting unit and changing the state of the reproduction, the reproducing unit is operable to notify the return position determining unit of the reproduction state change information, and wherein, after the reproduction of the stream media content has ended, the return position determining unit is operable to determine the return position based on the reproduction state change information.

14. The content reproduction device according to claim 1, wherein the return position determining unit holds a state of the reproduction that changes each time the reproduction state change information is received from the reproducing unit, and is operable to determine the return position based on the state of the reproduction after the reproduction of the stream media content has ended.

15. The content reproduction device according to claim 1,
wherein the display unit holds a state of the reproduction that changes each time the reproduction state change information is received from the reproducing unit, and
wherein, after the reproduction of the stream media content has ended, the display unit is operable to determine the return position according to the state of the reproduction and notify the return position determining unit of the determined return position.

16. The content reproduction device according to claim 15, wherein, after the reproduction of the stream media content has ended, one of the display unit and the reproducing unit is operable to read the state of the reproduction and a history of the reproduction state change information held in the reproduction history storing unit, to determine the return position, and to notify the return position determining unit of the determined return position.

17. The content reproduction device according to claim 1, wherein the reproducing unit holds a state of the reproduction that changes each time the state of the reproduction of the stream media content is changed, and is operable, after the reproduction of the stream media content has ended, to determine the return position according to the state of the reproduction, and to notify the return position determining unit of the determined return position.

18. The content reproduction device according to claim 17, wherein, after the reproduction of the stream media content has ended, one of the display unit and the reproducing unit is operable to read the state of the reproduction and a history of the reproduction state change information held in the reproduction history storing unit, to determine the return position, and to notify the return position determining unit of the determined return position.

19. The content reproduction device according to claim 1, wherein the return position determining unit is operable to (a) determine a screen for exempting charging, as the return position of the multimedia content, in a case when the reproduction state change information is not found until the reproduction of the stream media content has ended, and (b) determine a screen for charging, as the return position of the multimedia content, in a case when the reproduction state change information is found before the reproduction of the stream media content has ended.

20. The content reproduction device according to claim 1,
wherein the reproduction state change information includes at least a reproduction history indicating a relationship between the state of the reproduction and time information, and
wherein the return position determining unit obtains transition condition information describing a relationship between (a) a return condition defined by the state of the reproduction and the time information and (b) the determined return position, and determines the return position based on whether or not the reproduction history included in the reproduction state change information satisfies the return condition included in the obtained transition condition information.

21. A content reproduction method used by a content reproduction device that reproduces a stream media content that is linked to from a multimedia content written in a markup language used for Web browsing, wherein a state of the reproduction of the stream media content can be changed according to an instruction by a user and the reproduction of the stream media content is performed for a predetermined consecutive period of time, the content reproduction method comprising:
a display step of displaying the multimedia content;
a reproduction step of reproducing the stream media content that is linked to from the displayed multimedia content;
a reproduction state change acceptance step of accepting, from the user, reproduction state change information indicating a change in the state of the reproduction of the stream media content by the reproduction step; and
a return position determination step of determining, based on the reproduction state change information accepted in the reproduction state change acceptance step, whether or not all of the stream media content has been reproduced by the reproduction step,
wherein, when the return position determination step determines that all of the stream media content has been reproduced, the return position determination step determines, as a first return position, a return position indicating a portion of the multimedia content to be displayed when transitioning from reproducing the stream media content back to displaying the multimedia content when the reproduction of the stream media content by the reproduction step has ended,
wherein, when the return position determination step determines that all of the stream media content has not been reproduced, the return position determination step determines, as a second return position, a return position that is different from the first return position, and
wherein the display step includes (i) displaying the determined first return position of the multimedia content when the return position determination step determines that all of the stream media content has been reproduced, and (ii) displaying the determined second return position of the multimedia content when the return position determination step determines that all of the stream media content has not been reproduced.

22. The content reproduction method according to claim 21, wherein, in the return position determination step, a transition condition table describing a relationship between the state of the reproduction and the determined return position is obtained, and the determined return position is determined based on the transition condition table and the reproduction state change information.

23. A non-transitory computer-readable recording medium having a program recorded thereon, the program being used by a content reproduction device that reproduces a stream media content that is linked to from a multimedia content written in a markup language used for Web browsing, wherein a state of the reproduction of the stream media content can be changed according to an instruction by a user and the reproduction of the stream media content is performed for a predetermined consecutive period of time, the program causing the content reproduction device to execute a method comprising:
a display step of displaying the multimedia content;
a reproduction step of reproducing the stream media content that is linked to from the displayed multimedia content;

a reproduction state change acceptance step of accepting, from the user, reproduction state change information indicating a change in the state of the reproduction of the stream media content by the reproduction step; and a return position determination step of determining, based on the reproduction state change information accepted in the reproduction state change acceptance step, whether or not all of the stream media content has been reproduced by the reproduction step, wherein, when the return position determination step determines that all of the stream media content has been reproduced, the return position determination step determines, as a first return position, a return position indicating a portion of the multimedia content to be displayed when transitioning from reproducing the stream media content back to displaying the multimedia content when the reproduction of the stream media content by the reproduction step has ended, wherein, when the return position determination step determines that all of the stream media content has not been reproduced, the return position determination step determines, as a second return position, a return position that is different from the first return position, and wherein the display step includes (i) displaying the determined first return position of the multimedia content when the return position determination step determines that all of the stream media content has been reproduced, and (ii) displaying the determined second return position of the multimedia content when the return position determination step determines that all of the stream media content has not been reproduced.

24. The non-transitory computer-readable recording medium according to claim 23, wherein, in the return position determination step, a transition condition table describing a relationship between the state of the reproduction and the determined return position is obtained, and the determined return position is determined based on the transition condition table and the reproduction state change information.

* * * * *